United States Patent
Rothschild (10) Patent No.: US 9,871,415 B2
(45) Date of Patent: *Jan. 16, 2018

(54) TRANSFERRING POWER TO A MOBILE DEVICE

(71) Applicant: ARIEL INVENTIONS, LLC, Sunny Isles Beach, FL (US)

(72) Inventor: Leigh M. Rothschild, Sunny Isles Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/242,245

(22) Filed: Aug. 19, 2016

(65) Prior Publication Data

US 2016/0359367 A1    Dec. 8, 2016

Related U.S. Application Data (63) Continuation of application No. 13/472,447, filed on May 15, 2012, now Pat. No. 9,448,603.

(60) Provisional application No. 61/530,971, filed on Sep. 3, 2011.

(51) Int. Cl.

| | | |
|---|---|---|
| G06F 1/26 | (2006.01) | |
| H02J 7/02 | (2016.01) | |
| H02J 50/10 | (2016.01) | |
| H02J 50/05 | (2016.01) | |
| H02J 5/00 | (2016.01) | |
| H02J 17/00 | (2006.01) | |

(52) U.S. Cl.
CPC ............. *H02J 50/10* (2016.02); *G06F 1/266* (2013.01); *H02J 5/005* (2013.01); *H02J 7/025* (2013.01); *H02J 17/00* (2013.01); *H02J 50/05* (2016.02)

(58) Field of Classification Search
None
See application file for complete search history.

(56) References Cited

U.S. PATENT DOCUMENTS

| | | | | |
|---|---|---|---|---|
| 2009/0108679 A1* | 4/2009 | Porwal | ................... | H02J 17/00 307/104 |
| 2010/0072825 A1* | 3/2010 | Azancot | ................. | H02J 5/005 307/104 |
| 2012/0303980 A1* | 11/2012 | Culbert | .................... | G06F 1/26 713/300 |

(Continued)

*Primary Examiner* — Jared Fureman
*Assistant Examiner* — Aqeel Bukhari
(74) *Attorney, Agent, or Firm* — Eugenio J. Torres-Oyola; Victor Rodriguez-Reyes; Rafael Rodriguez-Muriel (57) ABSTRACT

Embodiments of the disclosure may include a system for transferring power, the system having a donor mobile device. Such a donor mobile device may include processor (s) and a donor wireless power transfer mechanism coupled to the processor(s). In addition, the donor mobile device may include software application(s) that: (i) configure the donor wireless transfer mechanism on the donor mobile device to initiate power transfer; and (ii) transfer power using the donor wireless transfer mechanism. The system may also have a receptor mobile device including processor(s) and a receptor wireless power transfer mechanism coupled to the processor(s). Further, the receptor mobile device may include software application(s) that: (i) configure the receptor power transfer mechanism on the receptor mobile device to receive power; and (ii) receive and convert received power into electric current using the receptor power transfer mechanism.

6 Claims, 9 Drawing Sheets

(56) References Cited

U.S. PATENT DOCUMENTS

2013/0026981 A1* 1/2013 Van Der Lee .......... H02J 5/005
320/108

* cited by examiner

```
Power Adapter
402

┌─────────┐   ┌─────────┐
  │ Donor   │   │Receptor │
  │ WPTM    │   │ WPTM    │
  │ 408     │   │ 410     │
  └─────────┘   └─────────┘

┌─────────┐   ┌─────────┐
  │Wireless │   │Wireless │
  │Transmit │   │Receive  │
  │SW 412   │   │SW 414   │
  └─────────┘   └─────────┘

┌────────┐ ┌────────┐ ┌──────┐
  │Control │ │Memory  │ │ CPU  │
  │SW 416  │ │ 418    │ │ 420  │
  └────────┘ └────────┘ └──────┘

┌────────┐              ┌────────┐
│Comm I/F│              │Comm I/F│
│ 1 422  │              │ 2 424  │
└────────┘              └────────┘
```

TRANSFERRING POWER TO A MOBILE DEVICE

CROSS-REFERENCE TO RELATED APPLICATIONS

The present application claims priority under the laws and rules of the United States, including 35 U.S.C. §120, to U.S. patent application Ser. No. 13/472,447, filed on May 15, 2012, which claims priority to U.S. Provisional Patent Application No. 61/530,971 filed on Sep. 3, 2011, which is hereby incorporated by reference in its entirety.

BACKGROUND

Consumers in today's society may own or operate more than one portable or mobile device for work or leisure activities. Such portable/mobile devices include but are not limited to laptop, notebook, and tablet computers as well as mobile phones and portable gaming systems. Each portable/mobile device has a limited or finite battery life that can be recharged by connecting the mobile device to an electrical outlet, vehicle power source (e.g. lighter) or some other power source through a power supply.

There are many times the consumer is using a mobile device that has a low battery life and has the need to charge the mobile device battery but no electrical outlet or power source is available or the consumer does not have a power supply to access the power source (e.g. mobile device charger, computer power supply, etc.). However, the consumer may have other mobile devices at hand each having substantial battery life.

SUMMARY

The pending disclosure describes embodiments that include systems, methods, and devices for transferring power to a mobile device. In one embodiment of the pending disclosure a consumer has two mobile devices, one of which transfers power to the other. Such a mobile device is capable of providing wireless power transfer to another mobile device using a number of technologies known in the art that include, but are not limited to, electromagnetic induction, electromagnetic radiation, and electrical conduction. Electromagnetic induction methods include electrodynamic induction techniques such as inductive coupling as well as electrostatics induction techniques such as capacitive coupling. Electromagnetic radiation includes but is not limited to beamed power using radio waves, microwave transmission, and laser beaming techniques.

Embodiments of the disclosure include a method for transferring power to a receptor mobile device from a donor mobile device. Such a method includes configuring a donor wireless power transfer mechanism on the donor mobile device using a wireless transmit software application as well as configuring a receptor wireless power transfer mechanism on the receptor mobile device using a wireless receive software application. The method includes transferring power from donor mobile device to the receptor mobile device using the donor wireless power transfer mechanism and the receptor wireless power transfer mechanism. In addition, the method includes receiving and converting received power into electric current using the receptor wireless power transfer mechanism.

The method also includes configuring a donor power threshold using a wireless transmit software application and determining whether the donor mobile device has been reduced to the donor power threshold. Also, the method includes configuring a receptor power threshold using a wireless receive software application as well as determining whether the receptor mobile device exceeds the receptor power threshold. In addition, the donor wireless power transmission mechanism and the receptor wireless power transmission mechanism is selected from a group consisting of inductive coupling, capacitive coupling, microwave radiation, radio frequency radiation, laser radiation mechanisms or a combination thereof.

Embodiments of the disclosure include a system for transferring power, the system having a donor mobile device. Such a donor mobile device includes one or more processors and a donor wireless power transfer mechanism coupled to the one or more processors. In addition the donor mobile device includes one or more software applications that: (i) configure the donor wireless transfer mechanism on the donor mobile device to initiate power transfer; and (ii) transfer power using the donor wireless transfer mechanism.

The system includes a receptor mobile device including one or more processors and a receptor wireless power transfer mechanism coupled to the one or more processors. Further, the receptor mobile device includes one or more software applications that: (i) configure the receptor power transfer mechanism on the receptor mobile device to receive power; and (ii) receive and convert received power into electric current using the receptor power transfer mechanism.

The system also includes a wireless transmit software application that configures a donor power threshold and determines whether the donor mobile device has been reduced to the donor power threshold. Further, the system includes a wireless receive software application that configures a receptor power threshold and determines whether the receptor mobile device exceeds the receptor power threshold. In addition, the donor wireless power transmission mechanism and the receptor wireless power transmission mechanism is selected from a group consisting of inductive coupling, capacitive coupling, microwave radiation, radio frequency radiation, laser radiation mechanisms or a combination thereof.

Embodiments of the disclosure include a device for transferring power having one or more processors, a donor wireless power transfer mechanism coupled to the one or more processors, and one or more software applications that: (i) configure the donor wireless transfer mechanism on the donor mobile device to initiate power transfer; and (ii) transfer power using the donor wireless transfer mechanism. The device also includes a receptor wireless power transfer mechanism coupled to the one or more processors and one or more software applications that: (i) configure the receptor power transfer mechanism on the receptor mobile device to receive power using one or more software applications; (ii) receive and convert received power into electric current using the receptor power transfer mechanism. Further, the device includes a wireless transmit software application that configures a donor power threshold and determines whether the donor mobile device has been reduced to the donor power threshold. In addition, the device includes a wireless receive software application that configures a receptor power threshold and determines whether the receptor mobile device exceeds the receptor power threshold. The donor wireless power transmission mechanism and the receptor wireless power transmission mechanism is selected from a group consisting of inductive coupling, capacitive coupling, microwave radiation, radio frequency radiation, laser radiation mechanisms or a combination thereof.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presently preferred, it being understood, however, that the invention is not limited to the precise arrangements and instrumentalities shown, wherein.

DETAILED DESCRIPTION

Figure 1:
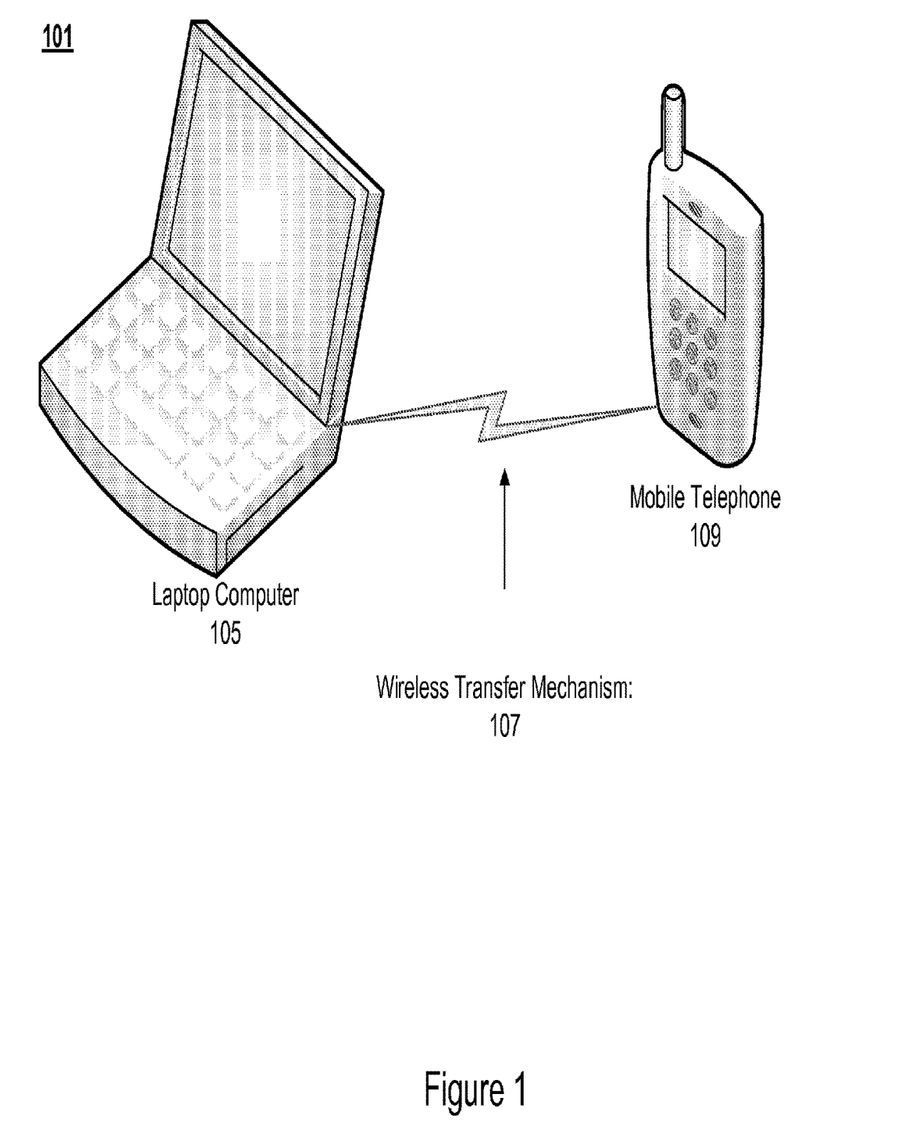
FIG. 1 is a diagram of an exemplary system for wirelessly transferring power from donor device to a receptor device.

FIG. 1 is a diagram of an exemplary system 101 for wirelessly transferring power from a donor device to a receptor device. The donor device can be a mobile device such a laptop computer 105 and the receptor device can be a mobile device such as a mobile telephone 109. Alternatively the donor device and/or receptor device can be any mobile device such as a laptop computer, notebook computer, tablet computer, mobile phone, portable gaming system or the like. In one embodiment, a user is using a mobile phone 109 extensively throughout a day resulting in the mobile phone having low battery life. Further, the user may have to use the mobile phone 109 for an upcoming conference call and realizes that the mobile phone 109 does not have enough battery life to complete the call. However, the user has a laptop computer 105 with substantial battery life but no power supply or adapter to connect the mobile phone 109 to the laptop computer 105 to charge the mobile phone battery. Instead, according to the embodiments of the pending disclosure, a wireless power transfer mechanism 107 from the notebook computer to the mobile phone can be available to charge the mobile phone battery thereby extending the battery life to allow the user to complete the upcoming conference call.

The wireless power transfer mechanism 107 is capable of incorporating a number of technologies known in the art that include, but are not limited to, electromagnetic induction, electromagnetic radiation, and electrical conduction. Electromagnetic induction technologies include electrodynamic induction techniques such as inductive coupling as well as electrostatics induction techniques such as capacitive coupling. Electromagnetic radiation technology includes but is not limited to beamed power using radio waves, microwave transmission, and laser beaming techniques.

Inductive Coupling Wireless Power Transfer

Figure 2A:
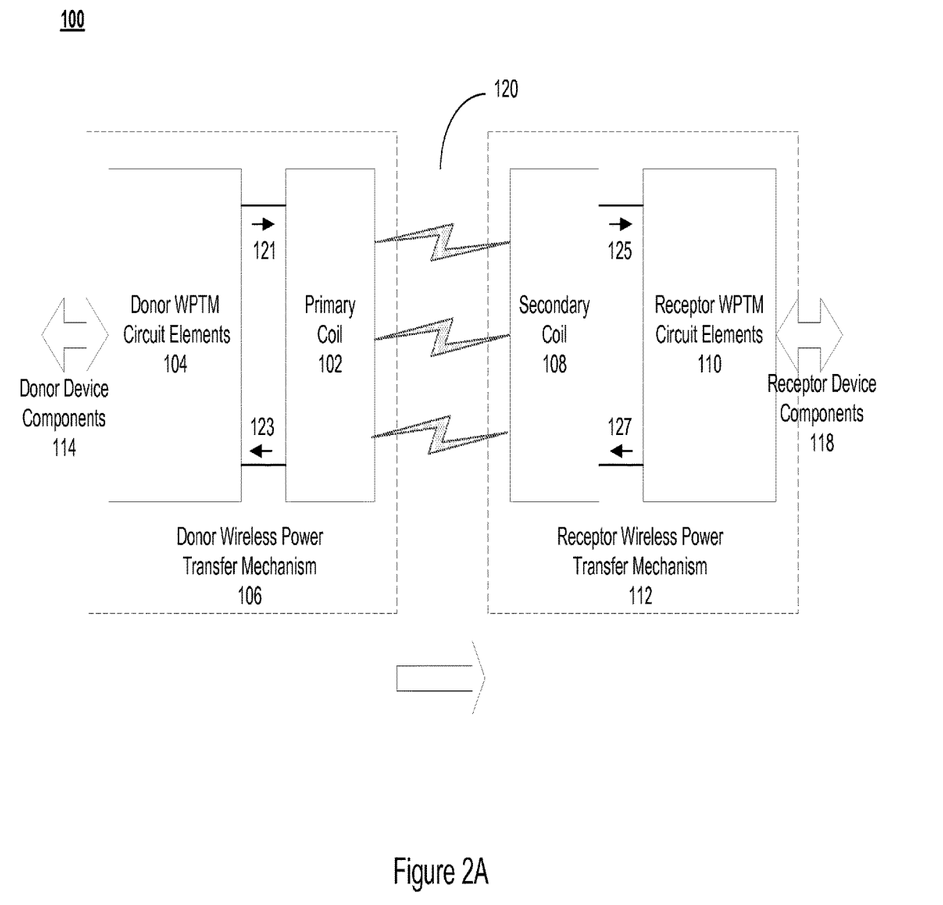
FIG. 2A is a block diagram of an exemplary system for wirelessly transferring power from donor device to a receptor device using electromagnetic induction.

FIG. 2A is a block diagram of an exemplary system for wirelessly transferring power from donor device to a receptor device using electromagnetic induction. Electromagnetic induction can be implemented in several different ways that includes electrodynamic induction (also called inductive coupling) and electrostatic induction (also called capacitive coupling). Generally, electromagnetic induction is the production of an electric current across a conductor moving through a magnetic field. Further, electromagnetic induction is used in the operation of generators transformers, induction motors, electric motors, synchronous motors, and solenoids.

Referring to FIG. 2A, a wireless transfer mechanism (as shown in FIG. 1) incorporates inductive coupling techniques. Further, the exemplary system for wireless transferring power includes a donor wireless power transfer mechanism (WPTM) 106 and a donor wireless power transfer mechanism 112 using electrodynamic or inductive coupling techniques. A donor WPTM 106 includes a primary coil 102 coupled to other donor WPTM circuit elements 104. Further, the donor WPTM circuit elements 104 are coupled to other donor device components 114. The primary coil 102 and the donor WPTM circuit elements 104 of the donor WPTM 106 as well as the donor device components 114 reside on a donor mobile device such as laptop computer as shown in FIG. 1.

The wireless transfer mechanism (as shown in FIG. 1) also includes a receptor WPTM 112 that has a secondary coil 108 coupled to receptor WPTM circuit elements 110. Further, the receptor WPTM circuit elements 110 are coupled to other receptor device components 118. The secondary coil 108 and the receptor WPTM circuit elements 110 of the receptor WPTM 112 as well as the donor device components 118 reside on a receptor mobile device such as mobile telephone as shown in FIG. 2A.

The primary coil 102 is driven by electric current (121 and 123) from the donor WPTM circuit elements of donor WPTM 106. Electric current (121 and 123) through the primary coil 102 generates a magnetic field 120 that surrounds secondary coil 108. The magnetic field 120 generates an electric current (125 and 127) thereby providing electric current (125 and 127) to receptor WPTM circuit elements 110 and receptor device components 118. Thus, the primary coil 102 and secondary coil 108 act similar to the coils of a power transformer that uses electromagnetic induction or inductive coupling to transfer power from a primary coil to a secondary coil.

Donor device components 114 and receptor components 118 include the battery, computer processor(s), storage devices and memory components, communication interfaces, software applications as well as other components for a mobile device as described in the pending disclosure.

Further embodiments have primary coil 102 and secondary coil 108 substantially close together due the range of the magnetic field 120 generated by the primary coil 102. Thus, in such embodiments the donor WPTM 106 and receptor WPTM 112 reside on the donor mobile device such as the laptop computer 105 in FIG. 1. Thus, the receptor device components 118 include a wire that is capable of coupling to a communication interface donor mobile device (e.g. USB, firewire, etc.) and also coupled to the receptor mobile device through a communication interface (e.g. USB, firewire, etc.) to charge the receptor battery. The charge storage device can be a rechargeable battery incorporated in a flash drive or can be one or more capacitors that can store charge for a significant amount of time. Such a charge storage device is also capable of being coupled to a receptor mobile device such as a mobile telephone 109 as shown in FIG. 1. Additional embodiments include that the donor WPTM 106 and receptor WPTM 112 both residing on the receptor mobile device. Thus, a wire coupled to the donor mobile device provides electric current through the primary coil 102 inducing a magnetic field 120 and providing electric current (125 and 127) through secondary coil 108 thereby providing power to the receptor mobile device.

Capacitive Coupling Wireless Power Transfer

Figure 2B:
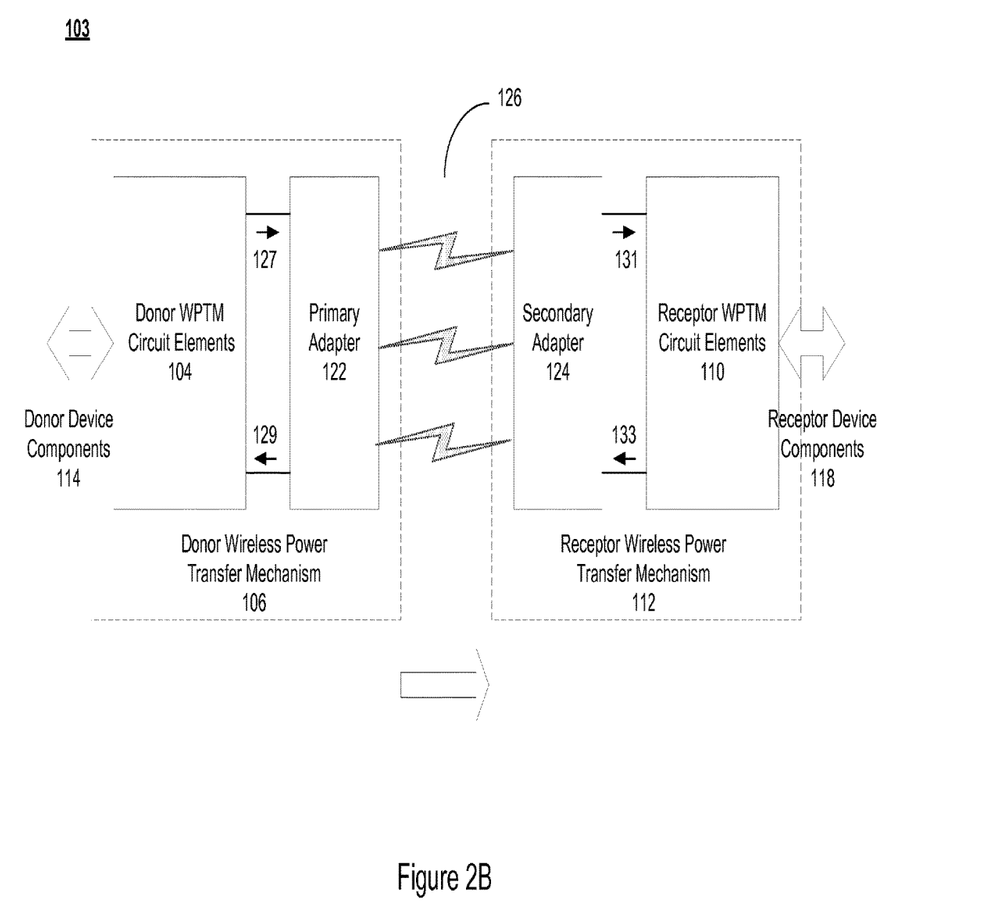
FIG. 2B is a block diagram of an exemplary system for wirelessly transferring power from donor device to a receptor device using capacitive coupling.

FIG. 2B is a block diagram of an exemplary system 103 for wirelessly transferring power from donor device to a receptor device using capacitive coupling. The exemplary system 103 includes a donor WPTM 106 and a receptor WPTM 112. Further, the donor WPTM 106 includes donor WPTM circuit elements 104 similar to the donor WPTM circuit elements described in FIG. 2A. In addition, the donor WPTM 106 is coupled to donor device components 114 as described when discussing FIG. 1B. Moreover, the receptor WPTM 112 includes receptor WPTM circuit elements 110 similar to the receptor WPTM circuit elements described when discussing FIG. 1B. Also, the receptor WPTM 112 is coupled to receptor device components 118 as described when discussing FIG. 2A.

The donor WPTM 106 includes a primary adapter 122 and the receptor WPTM 112 includes a secondary adapter 124. The donor WPTM 106 and receptor WPTM 112 uses electrostatic induction or capacitive coupling to wirelessly transfer power from primary adapter 122 to secondary adapter 124. In one embodiment, the primary adapter 122 includes a primary conductor and the secondary adapter 124 includes a secondary conductor. Further, when the electric current (127 and 129) runs through the primary adapter 122, the primary conductor in primary adapter 122 and the secondary conductor in secondary adapter 124 along with the air between the primary conductor and secondary conductor act like a capacitor. Thus, the primary conductor and the secondary conductor act as capacitor plates and the air in between the conductors acts as a dielectric of a capacitor. Therefore, electric current (127 and 129) charges the capacitor incorporating the primary conductor and secondary conductor. Subsequently, the capacitor incorporating the primary conductor and the secondary conductor discharges and generates electric current (131 and 133) to power the receptor WPTM circuit elements 110 and receptor device components 118.

As discussed when describing FIG. 2A, the donor WPTM 106 and the receptor WPTM 112 both reside on a donor mobile device such as laptop computer 105 or in a mobile telephone 109 as shown in FIG. 1. Further, the donor WPTM 106 and the receptor WPTM 112 both reside on a charge storage device or some other USB device as described when discussing FIG. 2A.

Electromagnetic Radiation Wireless Power Transfer

Figure 2C:
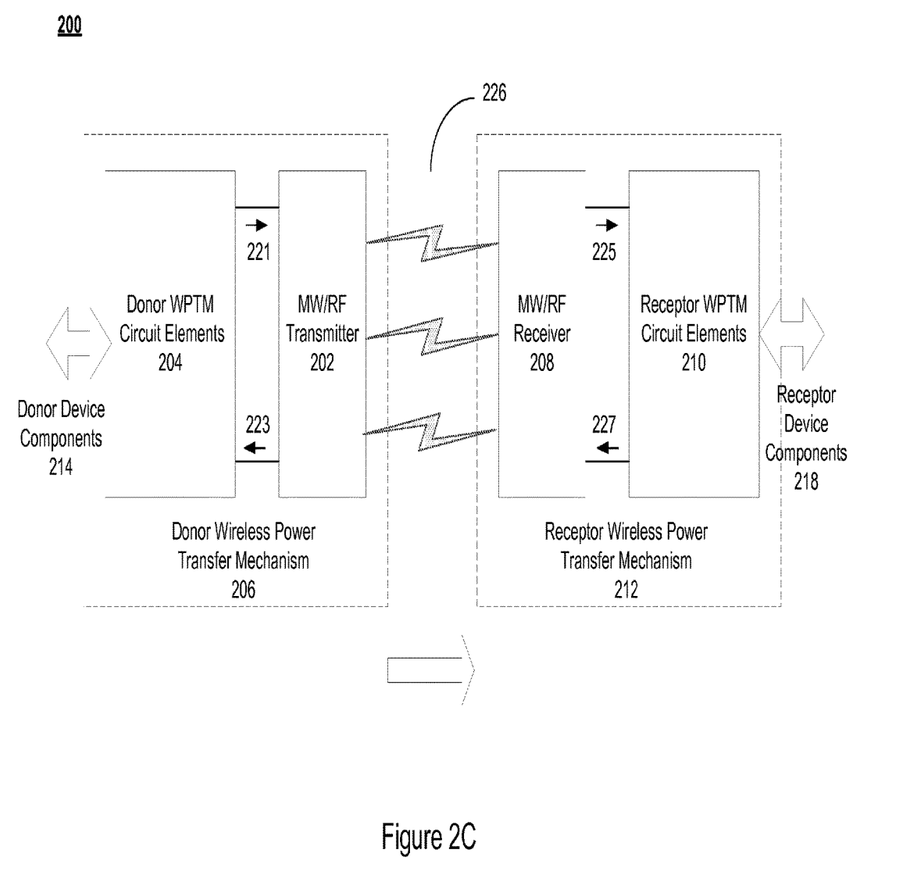
FIG. 2C is a block diagram of an exemplary system for wirelessly transferring power from donor device to a receptor device using electromagnetic radiation

FIG. 2C is a block diagram of an exemplary system 200 for wirelessly transferring power from donor device to a receptor device using electromagnetic radiation. The donor device can be a laptop computer 105 and the receptor device can be a mobile telephone 109 as shown in FIG. 1. Exemplary system 200 includes a donor wireless power transfer mechanism (WPTM) 206 having donor WPTM circuit elements 204 and a microwave (MW) or radio frequency (RF) transmitter 202. Further, the exemplary system 200 includes a receptor wireless power transfer mechanism (WPTM) 212 having receptor WPTM circuit elements 210 and a microwave or radio frequency (RF) receiver 208. In addition, donor WPTM circuit elements 204 and receptor WPTM circuit elements 210 are coupled to other donor device components 214 and receptor device components 218, respectively. Such donor and receptor device components (214 and 218) include the battery, computer processor(s), storage devices and memory components, communication interfaces, software applications as well as other components for a mobile device as described in the pending disclosure.

Donor electric current (221 and 223) powers the MW/RF transmitter 202 to emit microwave or radio frequency waves through the air 226 that are detected by the MW/RF receiver 208 on the receptor device. Further, the MW or RF waves 226 are capable of being directed by from the MW/RF transmitter 202 by a directional antenna or waveguide to the MW/RF receiver 208. Upon receiving the MW/RF waves 226, the MW/RF receiver 208 converts the energy received from the MW/RF waves 226 to receptor electric current (225 and 227) to power receptor WPTM circuit elements 210 and other receptor device components 218 such as the receptor device battery to extend battery life.

Wireless Power Transfer Using a Light Source

Figure 2D:
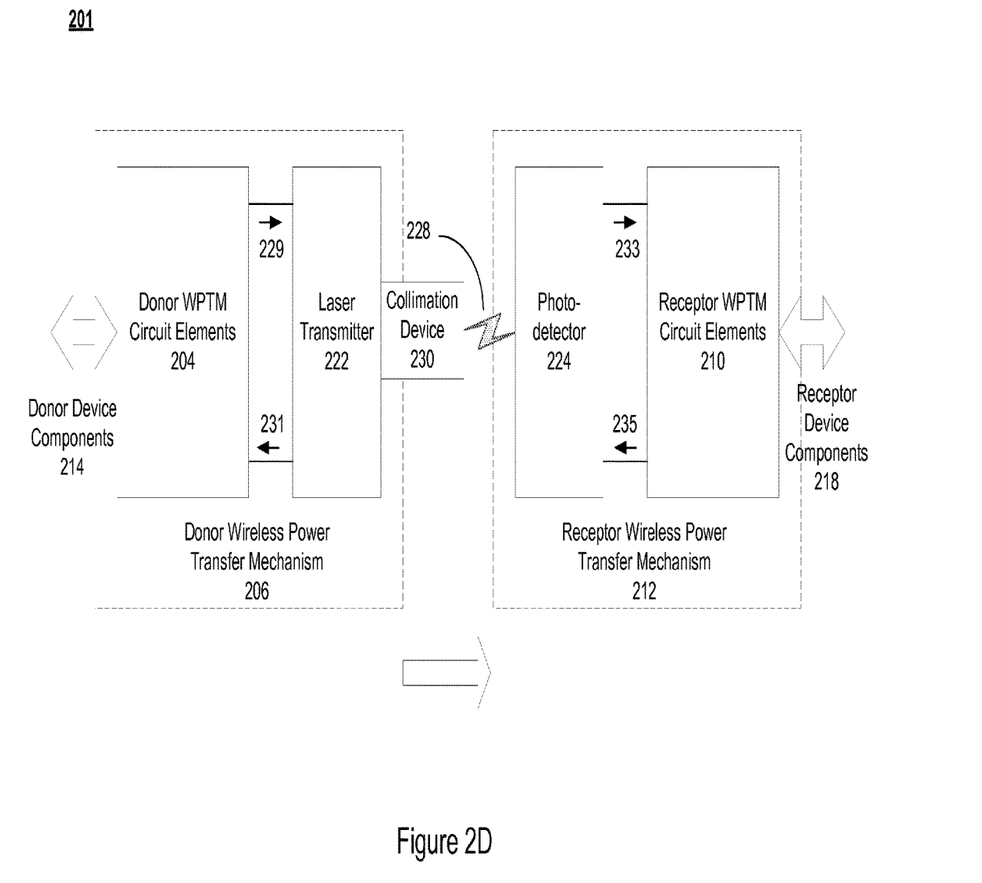
FIG. 2D is a block diagram of an exemplary system for wirelessly transferring power from donor device to a receptor device using a light source.

FIG. 2D is a block diagram of an exemplary system 201 for wirelessly transferring power from donor device to a receptor device using a light source. The donor device can be a laptop computer 105 and the receptor device can be a mobile telephone 109 as shown in FIG. 1A. Exemplary system 201 includes a donor WPTM 106 and a receptor WPTM 112. Further, the donor WPTM 206 includes donor WPTM circuit elements 204 coupled to donor device components 214. Moreover, the receptor WPTM 212 includes receptor WPTM circuit elements 210 coupled to receptor device components 218.

Further, donor WPTM 206 includes a laser transmitter 222 and collimation device 230. In addition, receptor WPTM 212 includes a photodetector 224. Electric current (229 and 231) provided by donor WPTM circuit elements 204 drive laser transmitter 222 to transmit a laser beam 228 toward photodetector 224. The collimation device 230 focuses the laser beam 228 toward the photodetector 224 so that the laser beam is not scattered away from the photodetector. Upon receiving the laser beam 228, photodetector 224 converts the received laser light energy into electric current (233 and 235) to drive receptor WPTM circuit elements 210. Further, the power is provided by the receptor WPTM circuit elements to receptor device components 218 such as the receptor battery extending battery life.

The donor WPTM circuit elements and the donor device components as well as the receptor WPTM circuit elements and receptor device components described in discussing FIGS. 2C-2D are similar to the donor WPTM circuit elements, the donor device components, receptor WPTM circuit elements and receptor device components described when discussing FIGS. 2A and 2B.

Additional embodiments include the donor device charging its own battery through its power supply coupled to an electrical power source (e.g. electrical outlet, vehicle lighter outlet, etc.) while wirelessly transferring power to a receptor device.

Figure 3:
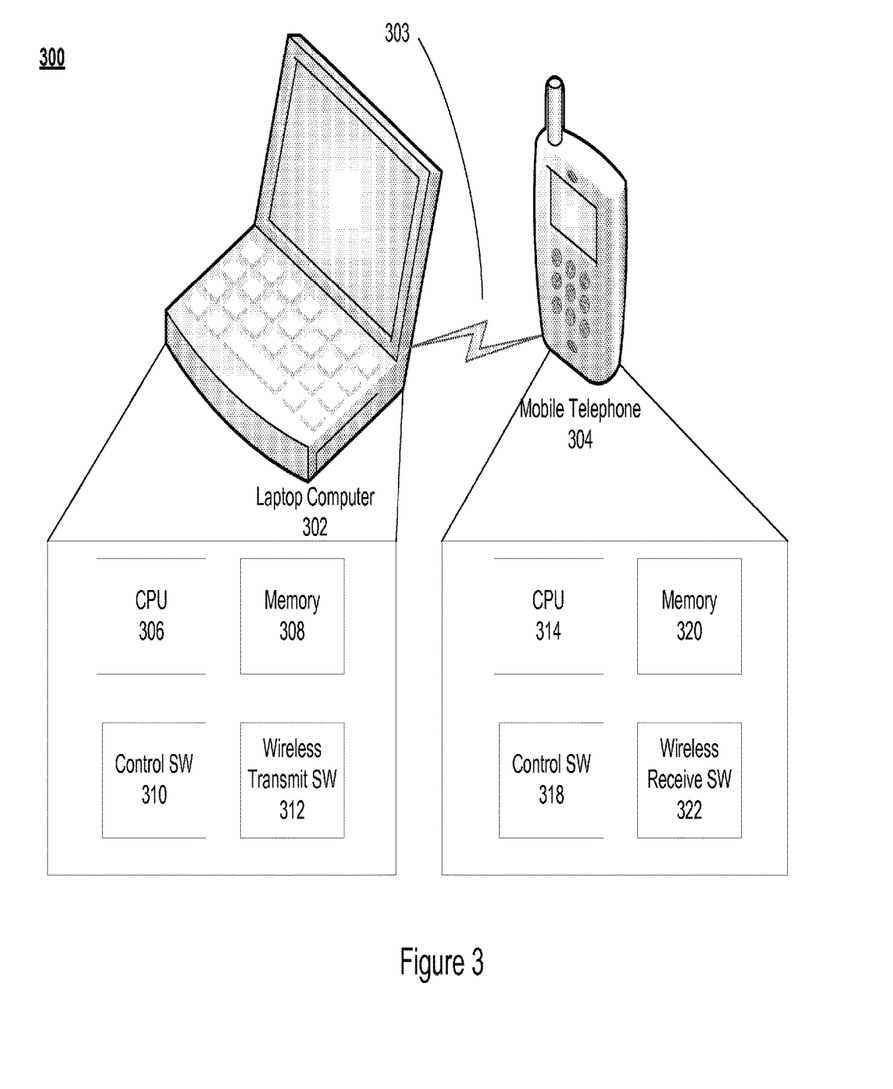
FIG. 3 is a block diagram of an exemplary system for wirelessly transferring power from donor device.

FIG. 3 is a block diagram of an exemplary system 300 for wirelessly transferring power from donor device such as laptop 302 to a receptor device such as a mobile telephone 304. The laptop computer 302 and mobile telephone 304 each include several components that include a central processing unit (CPU) or processors (306 and 314), memory components or storage devices (308 and 320) including removable storage media, and control software (SW) applications (310 and 318). Further, the control software applications (310 and 318) include software applications that implement software functions that assist in performing certain tasks for the laptop computer 302 and mobile telephone 304, respectively, such as providing access to a communication network, executing an operating system, managing software drivers for peripheral components, and processing information. In addition, the control software applications (310 and 318) also include software drivers for peripheral components, user interface computer programs, debugging and troubleshooting software tools. Also, the control software applications (310 and 318) include an operating system such as Droid, Symbian, IOS, Windows 7, Linux, Windows Mobile, MacOS, etc.

The laptop computer 302 wirelessly transfers power 303 to the mobile telephone 304 by one of the techniques described herein or known in the art such as inductive coupling, capacitive coupling, MW/RF radiation, and laser beam detection. Further, the laptop computer 302 includes a donor wireless power transfer mechanism and the mobile telephone 304 includes a receptor wireless power transfer mechanism as described in discussing FIGS. 1A-1C and 2A-2B. Such a donor WPTM is configured and managed by a wireless transmit software application 312 while a receptor WPTM is configured and managed by a wireless receive software application 322. The wireless transmit software application 312 and/or wireless receive software application 322 includes a function that allows a user to input a threshold (e.g. applicable to the battery life of the laptop 302 (donor power threshold) or mobile telephone 304 (receptor power threshold) to initiate wireless power transfer and continue wireless power transfer from the laptop computer 302 to mobile telephone 304 until battery of the laptop computer 302 or the mobile telephone 304 reaches the threshold (e.g. the laptop reaches a donor power threshold or the mobile telephone reaches a receptor power threshold). Alternatively, the user may enter a threshold to initiate wireless power transfer (if the laptop computer 302 and mobile telephone 304 are wirelessly coupled) when the mobile telephone battery is depleted to a threshold. The user may input such thresholds either on the laptop computer 302 and/or on the mobile telephone 304.

For example, the user configures the wireless transmit software application 312 and/or wireless receive software application 322 to manage the wireless power transfer by setting a donor power threshold for the battery life on the laptop computer. That is, the laptop computer 302 continues transferring power until the mobile telephone battery has been fully charged or that the laptop computer battery has decreased to 50% battery life. Alternatively, mobile telephone may currently have only 15% battery life. However, the user of the mobile telephone knows that an upcoming one hour conference call is capable of exhausting up to 50% of the mobile telephone's battery life. In addition, the laptop computer 302 has 95% battery life. Thus, the wireless transmit software application 312 sets a donor power threshold to continue transferring power to the mobile telephone 304 from the laptop computer 302 until the laptop computer's battery life is reduced to 45%. Alternatively, the wireless receive software application 322 sets a receptor power threshold to continue transferring power to the mobile telephone 304 from the laptop computer 302 until the mobile telephone's battery life exceeds 65%.

Wireless Power Transfer Using a Power Adapter

Figure 4A:
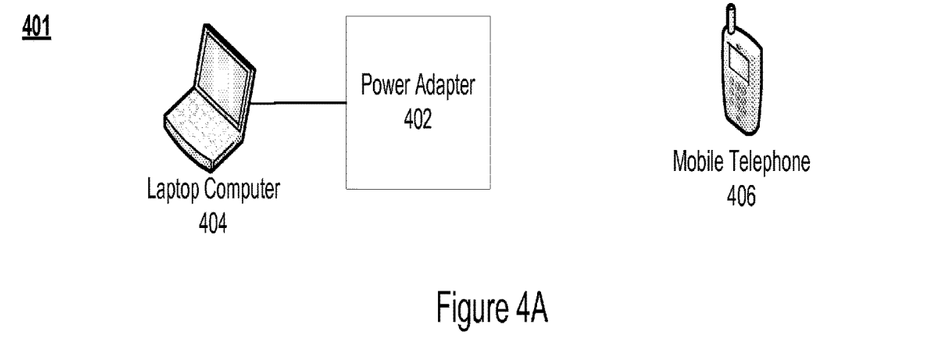
FIG. 4A is a block diagram of an example power adapter.
Figure 4B:
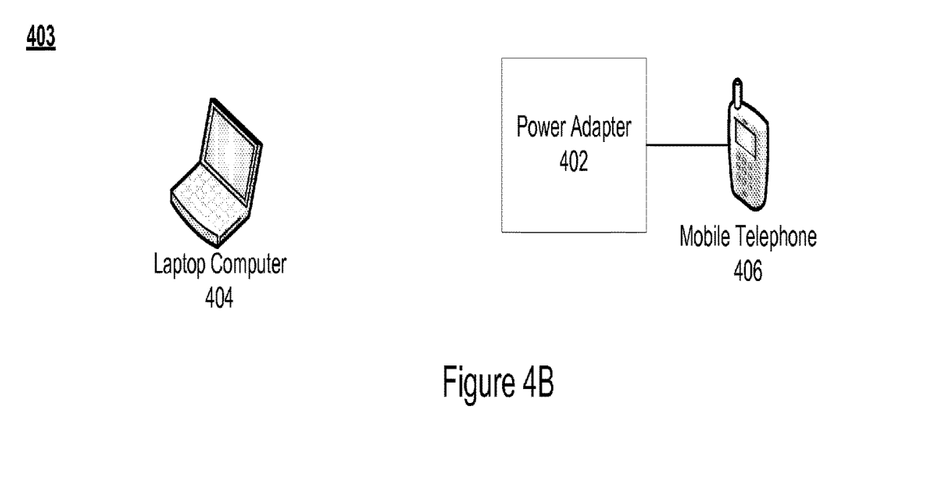
FIGS. 4B-4C are block diagrams of an exemplary system for transferring power from donor device to a receptor device using a power adapter.

FIGS. 4A-4B are block diagrams (401 and 403) of an exemplary system for wirelessly transferring power from donor device such as a laptop computer 404 to a receptor device such as a mobile telephone 406 using a power adapter 402. Such a power adapter 402 receives and store energy from the laptop computer 402 (See FIG. 4A) and is subsequently coupled and configured to discharge or transfer the stored energy to the mobile telephone 406 (See FIG. 4B).

Figure 4C:
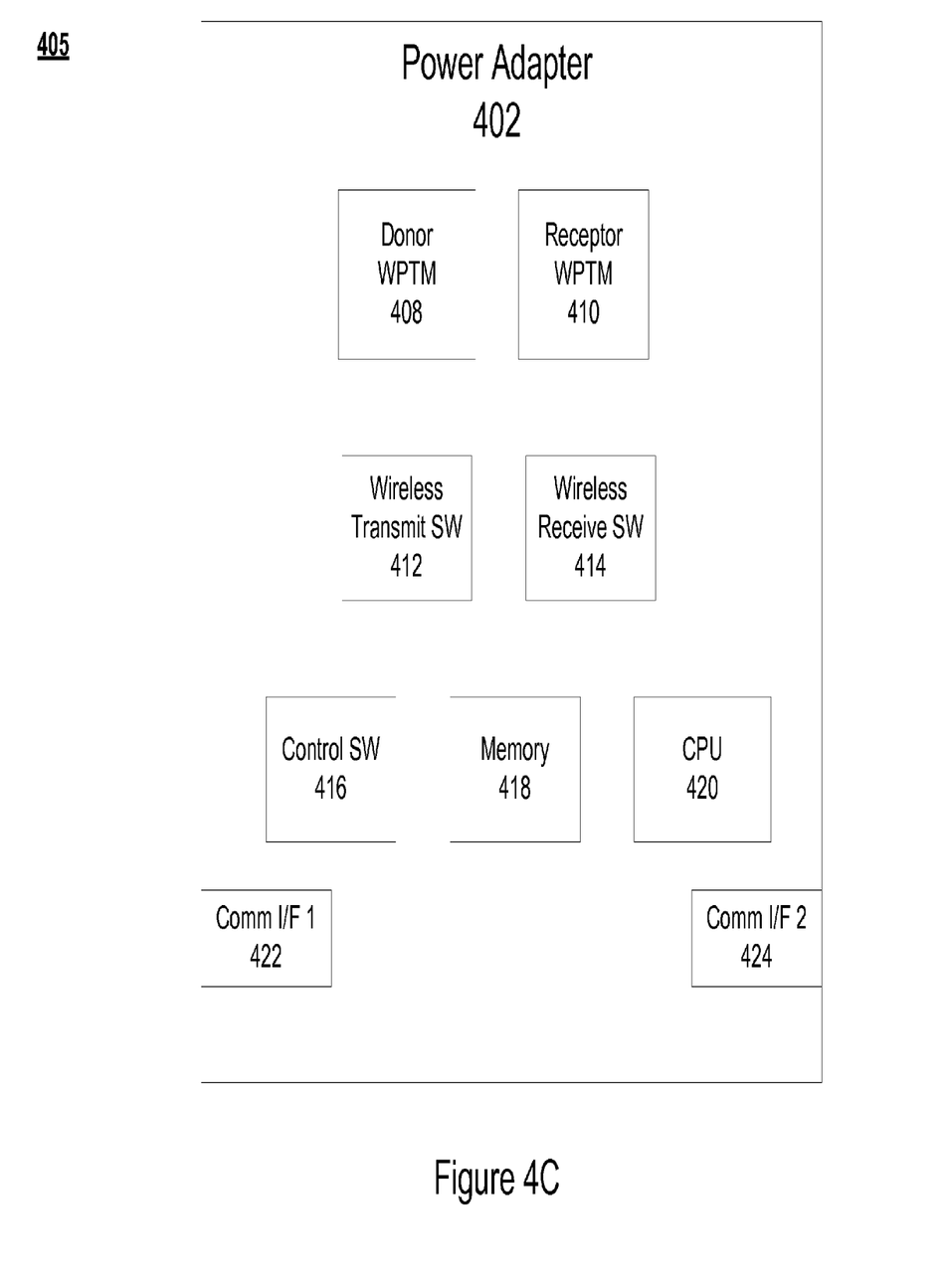

FIG. 4C is a block diagram 405 of an example power adapter 402 as described in discussing FIGS. 4A-4B. The power adapter 402 includes a donor WPTM 408 and a receptor WPTM 410. Further, the power adapter 402 includes a wireless transmit software application 412 and a wireless receive software application 414 that is used to configure or control donor WPTM 408 and receptor WPTM 410, respectively. In addition, the power adapter 402 includes one or more control software applications 416. The wireless transmit software application 412, wireless receive software application 414 as well as the one or more control software applications are similar to the software applications described when discussing FIG. 3. The power adapter 402 includes memory 418 that includes one or more storage devices known in the art including removable storage media. Further, the power adapter 402 also includes communication interface 1 (422) and communication interface 2 (424) which can be USB, firewire, or any other wired or wireless communication interfaces including the hardware or software components associated with such communication interfaces (422 and 424).

Power adapter 402 incorporates electromagnetic induction or electromagnetic radiation technology as described in the pending disclosure as well as known in the art to receive and store energy from a donor device and then transmit such stored energy to a receptor device. For example, the donor WPTM 408 includes primary coil and/or a subset of the donor WPTM circuit elements and the receptor WPTM 410 includes secondary coil and/or a subset of the receptor WPTM circuit elements discussed when describing FIG. 1B thereby allowing the power adapter 402 to use electromagnetic induction to transfer energy from the donor device to the receptor device. Alternatively, the donor WPTM 408 includes primary adapter and/or a subset of the donor WPTM circuit elements and the receptor WPTM 410 includes secondary adapter and/or a subset of the receptor WPTM circuit elements discussed when describing FIG. 1C thereby allowing the power adapter 402 to use capacitive coupling to transfer energy from the donor device to the receptor device. Thus, the donor WPTM 408 and the receptor WPTM 410 includes a charge storage device such as a capacitor that is charged by current received from the donor device and subsequently discharged when coupled to the receptor device thereby potentially increasing the battery life of the receptor device.

Moreover, the donor WPTM 408 includes the microwave (MW)/radio frequency (RF) transmitter and/or a subset of the donor WPTM circuit elements and the receptor WPTM 410 includes MW/RF receiver and/or a subset of the receptor WPTM circuit elements discussed when describing FIG. 2A thereby allowing the power adapter 402 to use MW/RF radiation to transfer energy from the donor device to the receptor device. In addition, the donor WPTM 408 includes the laser transmitter as well as a collimation device and/or a subset of the donor WPTM circuit elements and the receptor WPTM 410 includes photodetector and/or a subset of the receptor WPTM circuit elements discussed when describing FIG. 2B thereby allowing the power adapter 402 to use laser beam radiation to transfer energy from the donor device to the receptor device.

The power adapter 402 includes a rechargeable battery incorporated in a flash drive or one or more capacitors that can store charge for a significant amount of time and be discharged when coupled to the receptor device thereby charging the receptor device battery and extending battery life.

Figure 5:
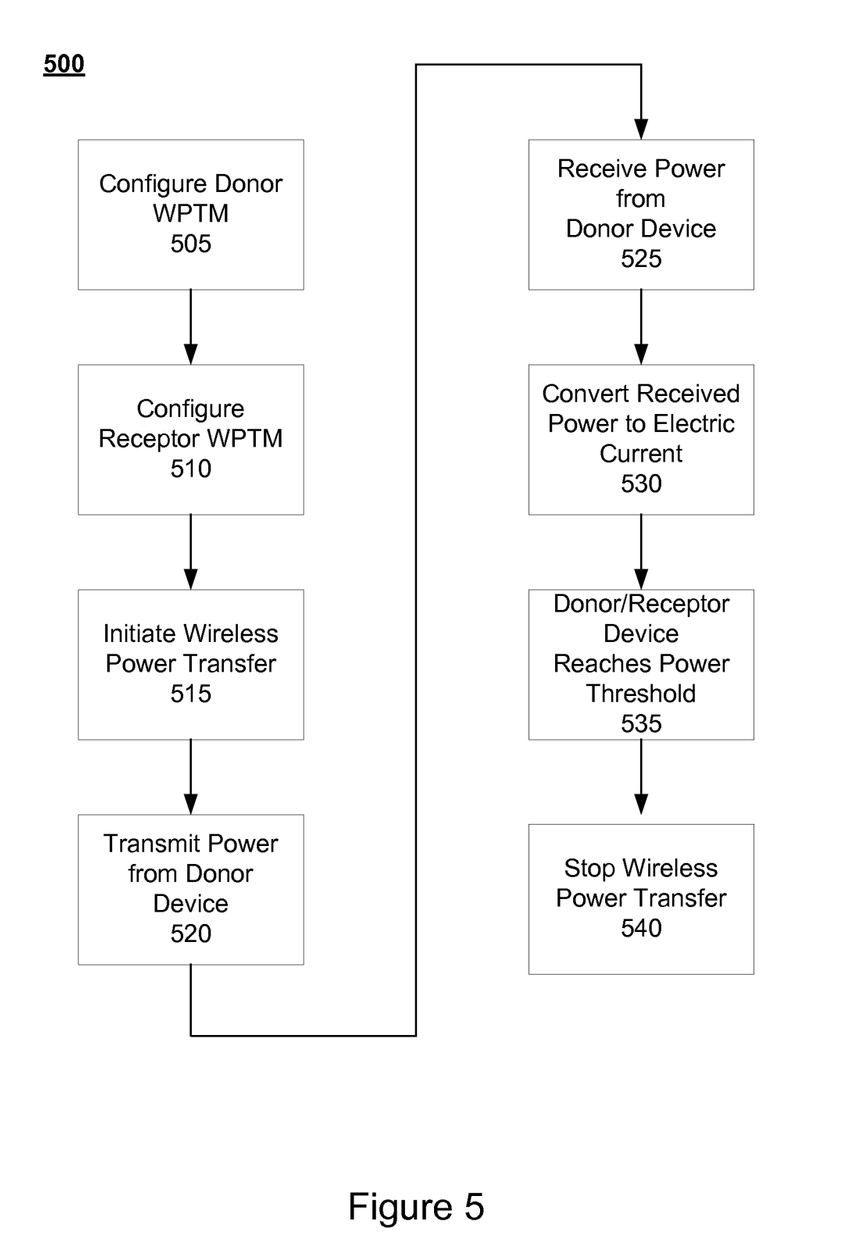
FIG. 5 is a flowchart illustrating an example method for wirelessly transferring power from donor device to a receptor device.

FIG. 5 is a flowchart illustrating an example method 500 for wirelessly transferring power from donor device. The example method includes configuring the donor WPTM on a donor device, as shown in block 505. The donor WPTMs include the primary coil or primary adapter associated with inductive and capacitive coupling, respectively discussed when describing FIGS. 1B and 1C or microwave, RF, or laser radiation as discussed when describing FIGS. 2A and 2B. Configuring the donor WPTM can be performed by a user through a wireless transmit software application as discussed when describing FIG. 3. The example method includes configuring a receptor WPTM on a receptor device, as shown in block 510. Moreover, the user configures to manage the wireless power transfer by setting a donor power threshold for the battery life on the donor device or the receptor device. That is, a laptop computer (donor device) continues transferring power until the mobile telephone (receptor device) battery has reached a receptor power threshold 85% of battery life or that the laptop computer battery has decreased to a donor power threshold of 50% battery life.

The receptor WPTMs includes the secondary coil or secondary adapter associated with inductive and capacitive coupling, respectively discussed when describing FIGS. 2A and 2B or microwave, RF, or laser radiation as discussed when describing FIGS. 2C and 2D. The configuring of the receptor WPTM is performed by a user through a wireless receive software application as discussed when describing FIG. 3.

In addition, the method includes initiating the power transfer, as shown in bock 515, which is performed by the wireless transmit software application. Further, the method includes the donor WPTM transmitting power from the donor device, as shown in block 520. The method also includes the receptor device receiving the power from the donor device, as shown in block 525. In addition, the method includes that the receptor WPTM converts the received power to electric current, as shown in block 530. The method further includes that the donor/receptor device reaches a power threshold, as shown in block 535. For example, the wireless power transfer is capable of being configured to continue until the receptor device has 95% of battery life or that the donor device battery life has decreased to 50% battery life. Upon reaching a power threshold (e.g. donor power threshold or receptor power threshold), the wireless power transfer is stopped, as shown in bock 540.

The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

The foregoing is illustrative only and is not intended to be in any way limiting. Reference is made to the accompanying drawings, which for a part hereof. In the drawings, similar symbols typically identify similar components, unless context dictates otherwise.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for transferring power to a receptor mobile device having a first battery from a donor mobile device having a second battery, comprising;
    configuring a donor wireless power transfer mechanism on the donor mobile device using a wireless transmit application;
    configuring a receptor wireless power transfer mechanism on the receptor mobile device using a wireless receive application;
    transferring power from donor mobile device to the receptor mobile device using the donor wireless power transfer mechanism and the receptor wireless power transfer mechanism until the first battery reaches a specific power threshold;
    receiving and converting received power into electric current using the receptor wireless power transfer mechanism;
    providing, by the donor wireless transfer mechanism, an electric current to a primary coil, the primary coil further providing electric current to a secondary coil in the receptor wireless transfer mechanism through a magnetic field; and
    storing an electric charge in a capacitor included in the receptor wireless power transfer mechanism thereby increasing battery life of the first battery when the capacitor is discharged, the battery life increase based on the specific power threshold.

2. The method of claim 1, further comprising configuring a donor power threshold using a wireless transmit application.

3. The method of claim 2, further comprising determining whether the donor mobile device has been reduced to the donor power threshold.

4. The method of claim 1, further comprising configuring a receptor power threshold using a wireless receive application.

5. The method of claim 1, further comprising determining whether the receptor mobile device exceeds the receptor power threshold.

6. A system for transferring power to a receptor mobile device having a first battery from a donor mobile device having a second battery, comprising:
    a donor wireless power transfer mechanism on the donor mobile device that uses a wireless transmit application;
    a receptor wireless power transfer mechanism on the receptor mobile device that uses a wireless receive application;
    wherein the donor mobile device transfers power to the receptor mobile device using the donor wireless power transfer mechanism and the receptor wireless power transfer mechanism until the first battery reaches a specific power threshold;

wherein the receptor wireless power transfer mechanism receives and converts received power into electric current;

wherein the donor wireless transfer mechanism provides an electric current to a primary coil and the primary coil further provides electric current to a secondary coil in the receptor wireless transfer mechanism through a magnetic field; and wherein a capacitor included in the receptor wireless power transfer mechanism stores an electric charge thereby increasing battery life of the first battery when the capacitor is discharged, the battery life increase based on the specific power threshold.

* * * * *